United States Patent [19]

Gallaher et al.

[11] Patent Number: 4,504,902
[45] Date of Patent: Mar. 12, 1985

[54] CACHE ARRANGEMENT FOR DIRECT MEMORY ACCESS BLOCK TRANSFER

[75] Inventors: Lee E. Gallaher; Wing N. Toy; Benjamin Zee, all of Glen Ellyn, Ill.

[73] Assignee: AT&T Bell Laboratories, Murray Hill, N.J.

[21] Appl. No.: 361,499

[22] Filed: Mar. 25, 1982

[51] Int. Cl.³ .................. G06F 9/00; G06F 13/00; G06F 9/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,056,844 | 11/1977 | Izumi | 364/200 |
| 4,197,580 | 4/1980 | Chang et al. | 364/200 |
| 4,268,907 | 5/1981 | Porter et al. | 364/200 |
| 4,398,243 | 8/1983 | Holberger et al. | 364/200 |
| 4,403,288 | 9/1983 | Christian et al. | 364/200 |

Primary Examiner—Raulfe B. Zache
Assistant Examiner—A. E. Williams, Jr.
Attorney, Agent, or Firm—D. Volejnicek; P. Visserman

[57] ABSTRACT

A cache memory system reduces cache interference during direct memory access block write operations to main memory. A control memory within cache contains in a single location validity bits for each word in a memory block. In response to the first word transferred at the beginning of a direct memory access block write operation to main memory, all validity bits for the block are reset in a single cache cycle. Cache is thereafter free to be read by the central processor during the time that the remaining words of the block are written without the need for additional cache invalidation memory cycles.

10 Claims, 3 Drawing Figures

CACHE ARRANGEMENT FOR DIRECT MEMORY ACCESS BLOCK TRANSFER

BACKGROUND OF THE INVENTION

1. Technical Field

This invention relates to digital computer systems and more particularly to digital computer systems utilizing cache memory arrangements.

2. Description of the Prior Art

Cache memory is useful to increase the throughput of a digital computer system. A cache memory system includes a small but relatively fast memory that temporarily contains information recently used by the central processor. During a read by the processor of main memory, the cache memory performs a memory cycle to determine whether the information being sought is contained in cache. If the information is present in cache—termed a "hit"—the information is returned to the processor and main memory is not accessed. If the information is not present—a "miss"—the information is read from main memory, returned to the central processor and written into cache for subsequent access as needed. During a write of information by the central processor to main memory the cache performs a memory cycle to determine if the information is present. If so, a control bit is reset in cache—a validity bit or V-bit—to indicate that the information word in cache has been superceded and is invalid. Alternatively, during a write of main memory the new information word may be written also into cache.

Direct memory access ("DMA") is also useful in digital computer systems. Direct memory access is typically used in conjunction with relatively slow bulk storage input-output devices such as disc storage. In response to a central processor request for input-output transfer—e.g. a read or write—to main memory, the DMA autonomously performs data transfer directly between the input-output device and main memory. The DMA steals main memory cycles as necessary to complete the requested transfer and typically interrupts the central processor when complete. DMA transfer may comprise the transfer of a single word of information, useful for moving data words for processing, or may comprise the transfer of a plurality of information words in a contiguous block. Block transfer is particularly useful for loading computer programs into main memory from input-output devices, such as occurs during swapping or paging.

A problem arises when a cache memory system of the type described above is utilized in conjunction with direct memory access. During a block DMA write it is preferred that the central processor remain free to execute instructions from cache. In practice, however, DMA operation requires a certain number of the available cache memory cycles. As each word of the block is transferred by DMA to main memory, the cache memory performs a necessary invalidation memory cycle in order to determine if each newly written word is present in cache and, if so, to reset its validity bit. The central processor is not able to access cache during the invalidation cycle so that program execution is momentarily suspended. If the number of words in a block is great, the number of required cache cycles is correspondingly great. It is desirable to reduce the number of cache invalidation memory cycles required for a block DMA transfer in order to increase the number of cache memory cycles available to the central processor.

Block DMA operation has correspondingly greater impact on multi-processor systems where each processor is associated with its own cache memory system. Each cache may be required to perform all invalidation memory cycles during a block DMA write, interfering with the operation of each processor and reducing overall throughput of the multi-processor system.

SUMMARY OF THE INVENTION

The problem of central processor interference during block DMA write is considerably reduced by use of the present invention. At the beginning of a block DMA write to main memory, cache memory performs a single invalidation memory cycle that determines if any word in the block is present in cache. If so, the entire block is invalidated in cache in a single cycle. All validity bits for the entire block are reset simultaneously and subsequent words in the block transfer do not require invalidation cycles. In this way, the number of cache memory invalidation cycles is reduced from a number equal to the number of words in a block to a much smaller number equal to one or a few cycles. Thus, in a system with 16 word blocks, central processor interference during block DMA write can be reduced from approximately 16 cycles to approximately one cycle, resulting in a 16-1 advantage for each central processor.

DETAILED DESCRIPTION

Figure 1:
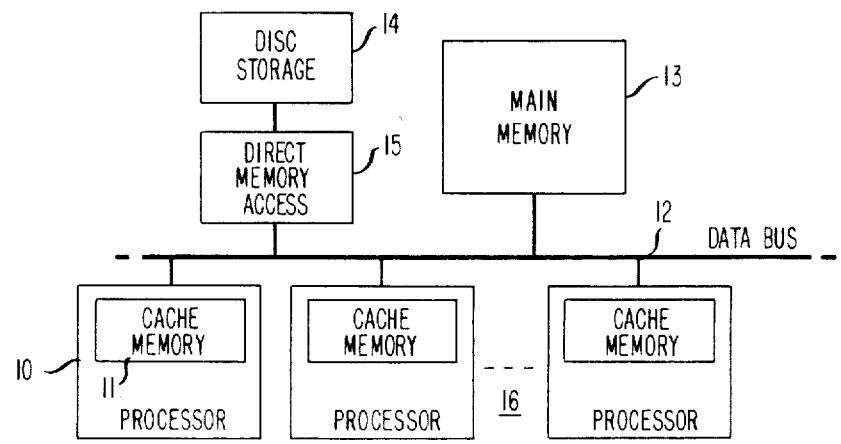
FIG. 1 is a computer system in which the present invention may be employed.

FIG. 1 shows an exemplary computer system that illustrates the environment in which the present invention advantageously may be employed. Central processor 10 accesses main memory 13 for instructions and data utilizing bus 12. In order to reduce the number of main memory accesses and bus occupancy by processor 10, local cache memory 11 is provided. Information words obtained from main memory are stored temporarily in cache. Read requests of main memory by processor 10 are intercepted by cache memory 11 which performs an associative look-up of the requested read address. If the information is present in the cache (a "hit"), this relatively smaller but faster memory will return the requested information quickly to processor 10 without accessing main memory or using bus 12. Main memory may have access time in the order of 800 nanoseconds while cache memory may have access time in the order of 200 nanoseconds, resulting in an approximate four to one speed advantage in processor operation from cache.

Input/output to relatively slower storage devices such as disc storage 14 is aided by direct memory access 15. In response to a request from processor 10, direct memory access 15 causes either a single word or a block—comprising, in the present embodiment, sixteen consecutive words—to be written directly from disc storage 14 into main memory 13 utilizing data bus 12 without further intervention of processor 10. Direct memory access 15 acts automatically to read or write main memory, "stealing" bus and memory cycles as necessary to effect the transfer.

For each write into main memory, cache memory 11 is checked and updated as necessary to assure that the contents of cache and main memory are not in conflict. If cache contains a copy of the word being written, the copy in cache is marked invalid by resetting an appropriate control bit within cache. Invalidation requires a cache memory cycle that momentarily precludes the cache from being used by processor 10. During a block direct memory access write of sixteen words at sixteen consecutive addresses in main memory, interference may occur between cache memory 11 and processor 10 for a total of sixteen cache cycles according to prior art methods. Because cache performs memory cycles at a rate four times faster than main memory in the present embodiment, the cache cycles required for invalidation will not themselves be consecutive, but will be interleaved with processor access cycles. However, a total of sixteen cycles will be required.

This effect is greater when multiple processors and cache memories are used as illustrated at 16 in FIG. 1. During write into main memory 13 by any of a multiplicity of direct memory access devices or processors connected to data bus 12, each cache memory performs the necessary invalidation cycles. During a direct memory access block transfer to main memory, all cache memories are required to perform invalidation cycles, which may interfere substantially with the operation of the multiprocessor system. This effect is reduced by utilizing the present invention described with respect to FIG. 3 below in each cache memory.

Figure 2:
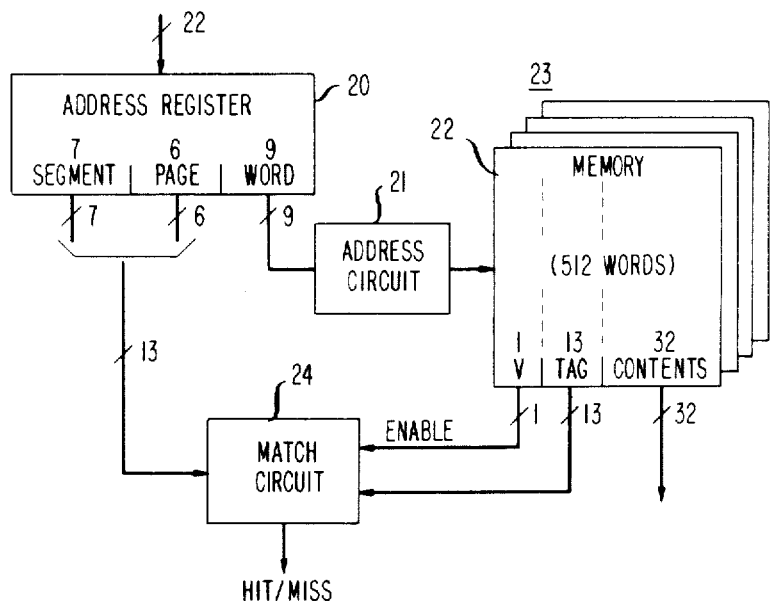
FIG. 2 is a prior art cache memory arrangement.

FIG. 2 is a diagram of a prior art cache memory arrangement of the type described in greater detail in U.S. Pat. No. 4,197,580, "Data Processing System Including a Cache Memory", issued Apr. 8, 1980, to S. Chang and W. N. Toy and assigned to the present assignee. This prior art arrangement may be used in cache memory 11 in the system of FIG. 1. The physical address at which main memory 13 is to be read or written is stored in the cache memory address register 20. In the present illustrative embodiment, 22 bits of address are used, the low order 9 bits representing the word address; 6 bits representing page address; and the high order 7 bits representing segment address. The word address is applied to address circuit 21 to a access memory 22. Memory 22 is read/write random access containing 512 words of 46 bits each in the present embodiment. Memory 22 may be augmented by additional memories 23 in appropriate numbers, as needed to provide the desired cache memory capacity. The use of additional memories 23 produces a "set associative" memory design and requires the replication of other circuitry such as match circuit 24, one such match circuit to be associated with each added memory. Such a set associative design is set forth in the prior referenced U.S. patent. Full replication is not illustrated in FIG. 2 as being well known in the prior art, but it is understood that set associative design is useful to increase cache capacity at the cost of additional complexity.

During a read cycle by processor 10, address register 20 is loaded with the address from which data is to be accessed. Address circuit 21 utilizes the low order word address bits to access the corresponding word from memory 22. (Simultaneous access is made of memories 23 in a set associative organization.) Information in memory 22 is divided into three fields; a 32-bit contents field which is a copy of an information word stored in main memory 13, a 13-bit tag field representing the high-order bits of the address at which the information is stored in main memory 13, and a single validity bit or "V-bit" which is set to one if the contents field is valid and may be used in place of the information stored in main memory 13. The V-bit is reset to zero to indicate that the contents of main memory 13 have been written since the time that the contents of memory 22 were written, and that the contents of memory 22 are invalid at the addressed location, and not to be used.

The 13 high-order address bits from register 20 and the 13 bits of the tag field read from memory 22 are compared in match circuit 24 in order to determine whether the contents stored at the addressed location in memory 22 represent the sought information. In addition, the validity bit at the accessed location is examined in match circuit 24 to ensure that the information contained is usable. In the event that the high-order address bits match the tag, and the validity bit is set to one, match circuit 24 produces a "hit" output indicating that the contents field of memory 22 is to be gated to the processor. Otherwise, match circuit 24 produces a "miss" output, indicating that the contents of memory 22 are not to be used and that main memory is to be read instead.

When a write is performed in main memory 13, cache memory 11 executes a cycle similar to that described in order to determine whether the contents of the main memory location are contained in memory 22. In the event of a hit, the validity bit at the addressed location in memory 22 is reset to zero, thus marking it invalid and assuring that the contents of memory 22 will not be used in subsequent reads, but that the up-to-date information in main memory 13 will be used instead.

The prior art cache memory of FIG. 2 has a single validity bit stored with each word in memory 22. Thus, each write into main memory will cause a cycle of cache memory. For a number of write operations, such as takes place during block write into main memory by direct memory access 15, the cache undertakes a corresponding number of cache memory cycles, thus reducing the availability of cache memory for reading by processor 10.

Figure 3:
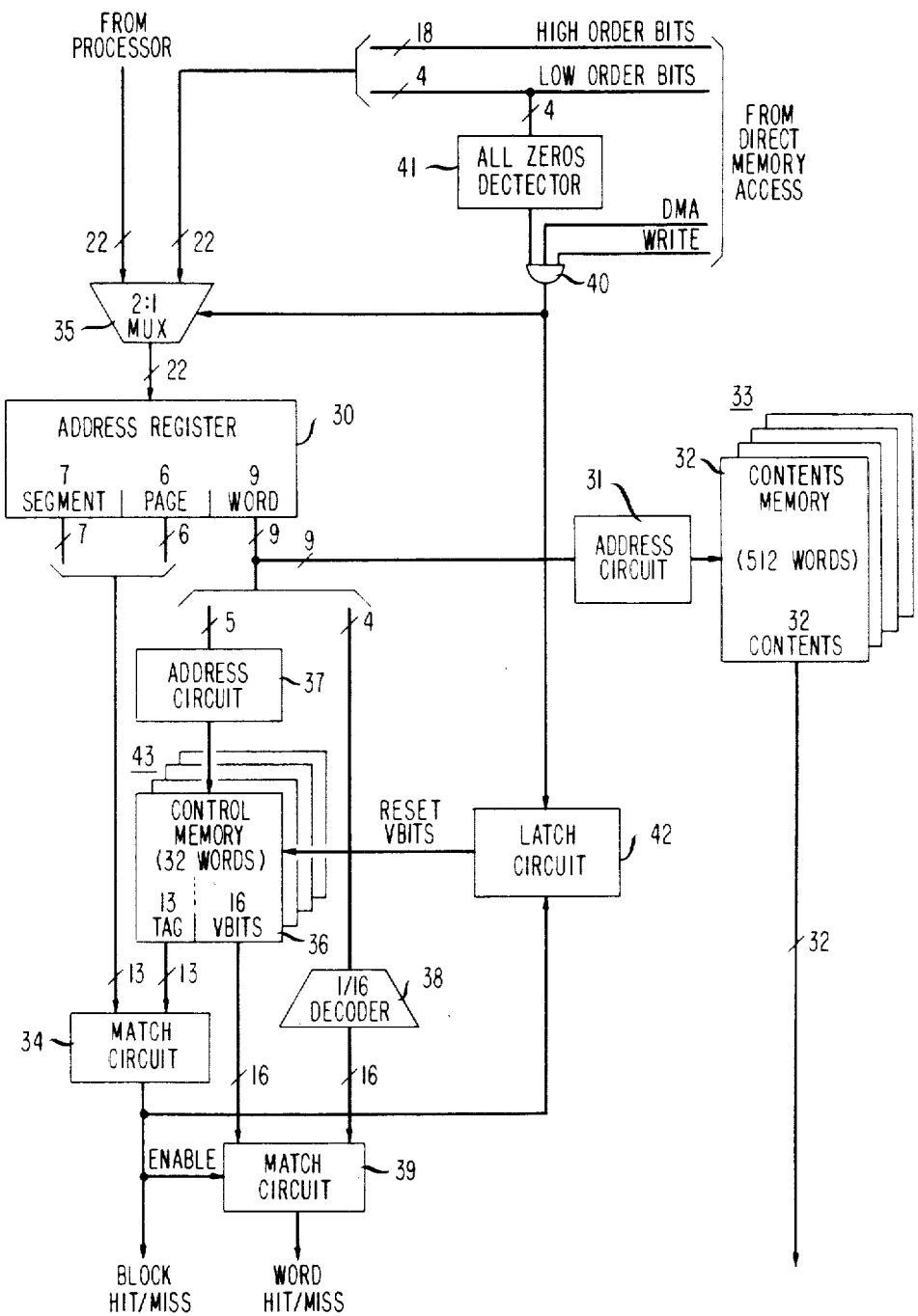
FIG. 3 is an embodiment of the present inventive cache memory arrangement.

FIG. 3 shows an illustrative embodiment of an improved cache memory arrangement according to the present invention. This inventive arrangement may be used advantageously in cache memory 11 in the system of FIG. 1. The physical address of the location to be read or written in main memory is stored in cache memory address register 30. In the present embodiment 22 bits of address are used, a 9 bit low order word address field, a 6 bit page address field, and a 7 bit high order segment address field. The word address is applied to address circuit 31 in order to access contents memory 32 which stores, in the present embodiment 512 words of 32 bits each. Read/write random access memory 32 contains temporary copies of words stored in main memory. The contents of a word location from memory 32 are gated to processor 10 when control circuitry including match circuit 39 determines that a hit is found during a memory read operation.

The high order 5 bits of the word address field of address register 30 are applied to address circuit 37 in order to access control memory 36, a read/write random access memory containing 32 words of 29 bits each in the present embodiment. Each word is divided into 2 fields, a 13 bit tag field and a 16 bit field containing 16 validity bits or V-bits. Each word in control memory 36 corresponds to a 16 word block in contents memory 32, the 13 bit tag being the high order address bits for each of the words in the 16 word block, and each of the 16 V-bits corresponding to one of the 16 words of the block in contents memory 32. In the present embodiment, a block comprises sixteen consecutive words beginning on a sixteen word boundary—e.g. beginning at an address with four low order address bits equal to zero.

Contents memory 32 may be augmented by additional content memories 33, and control memory 36 may be augmented by additional control memories 43 on a one-for-one basis. Each additional memory 43 contains the tag and V-bit information corresponding to an additional memory 33, to produce a set associative memory of the desired capacity. Replication of certain cache memory circuitry including match circuits 34, 39 and latch circuit 42, for example, is appropriate for a set associative implementation, as is obvious to those skilled in the art of cache memory design. Although a set associative cache memory may be useful in some applications that justify its complexity, further details of its design would be burdensome to the reader while not contributing to understanding of the invention. Application of the present invention to set associative memory design is within the scope of the inventive contribution.

The low order 4 bits of the word address stored in register 30 are decoded by one-of-16 decoder 38 in order to select the proper V-bit position from the V-bits field obtained from control memory 36. The V-bit position corresponding to the addressed word is compared with the V-bit contents obtained from control memory 36 in match circuit 39. The binary state of the selected V-bit is output by match circuit 39 when further enabled by match circuit 34.

The 13 bit tag field contained in control memory 36 represents the high order 13 address bits of the corresponding 16 word block stored in contents memory 32. This is in contra-distinction to the prior art system of FIG. 2 in which each word stored in memory 22 has an individual tag field. The 13 bit tag field obtained from control memory 36 is compared by match circuit 34 with the 13 high order address bits of register 30. A successful match results in a block hit binary output state from match circuit 34, indicating that one or more words within the block being addressed by register 30 is contained in memory 32, or that no valid words of the block are contained in memory 32 if all 16 V-bits are marked invalid. Match circuit 39 provides the V-bit information for the word being addressed, when provided with an enable signal from match circuit 34 to complete the word hit or miss indication analogous to that provided by match circuit 24 of FIG. 2.

It will be seen that the circuit of FIG. 3, as so far described, is capable of operating in a fashion analogous to that of the circuit of FIG. 2 for signal word read and write operations. There are, for example, 512 words of individual contents memory with a corresponding 512 total V-bits, having a one-to-one association. There are, however, 512 tags stored in the arrangement of FIG. 2 while there are 32 tags stored in the arrangement of FIG. 3. For FIG. 2 the tags correspond to the high order address bits of individual words while the tags of the arrangement of FIG. 3 correspond to the high order address bits of 16 word blocks.

For individual single word read operations, the hit/miss detection activity of the circuit of FIG. 3 is analogous to that of FIG. 2 due to the selection of individual V-bits from control memory 36 through the activity of decoder 38 and match circuit 39. The circuit of FIG. 3 may therefore be used in the same fashion as that of FIG. 2 with the contents of individual words being accessed on an individual basis for hit identification and for providing cache memory contents when available and valid. The action of decoder 38 further makes it possible to reset individual V-bits and thus invalidate the contents of memory 32 on an individual word basis when a write of an individual word to main memory takes place for a word contained in cache. The cache memory arrangement of FIG. 3 is capable of storing up to 512 words of information appearing in up to 32 different 16 word blocks.

Returning now to additional details of FIG. 3, the address stored in register 30 is obtained from one of two sources. Multiplexor 35 gates address information into register 30 either from the processor, for individual read and write operations, or from direct memory access, for block direct memory access write operations. The four low order address bits of the address applied by the direct memory access are sent to all zeros detector 41. The presence of zeros in the low order address bits indicates the beginning of a 16 word block. This condition in combination with signals indicating that direct memory access is active and that a write is taking place is detected by AND-circuit 40, which provides an output to indicate that a direct memory access block write is beginning. This output is sent to multiplexor 35 to control which of two addresses is gated into address register 30. Normally, multiplexor 35 gates the address from the processor to the address register. An output from AND-circuit 40 causes multiplexor 35 to gate the address from direct memory access into address register 30 instead of the normal processor address. In addition, the output from AND-gate 40 is sent to latch circuit 42 where it is retained for a period of time until block hit/miss detection is completed. Look-up of control memory 36 takes place, and match circuit 34 determines that a block hit is found. This indicates that one or more words are present in memory 32 in the block being addressed (unless all V-bits for the block are marked invalid).

The block hit output from match circuit 34 is sent to latch circuit 42 where it is combined with the information that direct memory access block write is beginning. As a result, invalidation is required; a signal is sent to control memory 36; and all 16 V-bits of the corresponding block stored in control memory 36 are reset to zero in a single operation. This is made possible by the fact that all 16 V-bits for the block are stored at the same physical location in control memory 36 along with the corresponding tag for the block being written by the block direct memory access write operation. Thus, if any word is contained within the cache memory arrangement of FIG. 3 within the block currently undergoing block direct memory access write, the V-bits for the entire block will be reset in a single cache memory cycle thus making it unnecessary for the cache memory to reset each V-bit in 16 individual cache memory cycles. The cache memory of FIG. 3 is thus made free for the remaining portion of the block direct memory access write operation.

It is understood that the above-described embodiment is merely illustrative of the principles of our invention; other arrangements may be devised by those skilled in the art without departing from the spirit and scope of the invention.

What is claimed is:

1. Apparatus comprising
main memory,
cache memory,
means coupled to said main memory for writing a block of consecutive words into said main memory by direct memory access,
means coupled to said cache memory and responsive to said means for writing a block for simultaneously invalidating all of the words of said block of consecutive words in said cache,
means coupled to said main memory for writing a word into said main memory, and
means coupled to said cache memory and responsive to said means for writing a word for invalidating only said word in said cache.

2. Apparatus comprising
main memory,
cache memory,
means coupled to said main memory for writing a block of consecutive words into said main memory by direct memory access,
means for detecting the occurrence of said writing,
means coupled to said cache memory and responsive to said means for detecting for simultaneously invalidating all of the words of said block of consecutive words in said cache,
means coupled to said main memory for writing a word into said main memory, and
means coupled to said cache memory and responsive to said means for writing a word for invalidating only said word in said cache.

3. Apparatus as set forth in claim 2 wherein
said cache memory includes means for storing a validity bit for each word of said block, and
said means for invalidating includes means for setting said validity bits to a predetermined state.

4. Apparatus as set forth in claim 3 wherein
said means for simultaneously invalidating further includes means for detecting the presence in said cache memory of at least one word of said block.

5. Apparatus as set forth in claim 3 or claim 4 wherein
said means for writing a block includes
means for writing each word of said block of consecutive words into said main memory by direct memory access, and wherein
said means for detecting the occurrence of said writing further includes
means for detecting the writing of a predetermined word of said block by said means for writing each word.

6. Apparatus as set forth in claim 5 wherein
each word has associated therewith an address comprising a plurality of bits including at least one bit that identifies individual words of a block, and wherein
said means for detecting the writing of a predetermined word of said block by said means for writing each word comprises
means for detecting all zeros in the at least one bit of the address of the word that is being written by said means for writing each word.

7. A cache memory system (11) comprising
an address register (30) for storing the physical address of a memory location to be written;
a contents memory (32) for storing the contents of said memory location, coupled to said address register and addressed by the low order word address bits of said address register;
a control memory (36) for storing the high order tag address bits for a block of n words stored in said contents memory and n validity bits, each said bit being associated with a distinct one of said n words stored in said contents memory, said control memory coupled to said address register and being addressed by a first number of said low order word address bits of said address register;
means coupled to said address register and said control memory for matching (34) the high order address bits of said address register with the tag address bits of said control memory in order to determine the presence within said contents memory of any word in the block of said memory location;
means coupled to said address register and said control memory and responsive to first said means for matching for decoding (38) a second number of said low order word address bits of said address register and for matching (39) said decoded number with n validity bits obtained from said control memory in order to determine the presence within said contents memory of said memory location; and
means coupled to said control memory and responsive to first said means for matching for simultaneously setting (42) the n validity bits of the block of said memory location to a predetermined state within said control memory when a word in the block of said memory location is present within said contents memory.

8. A cache memory system as set forth in claim 7 wherein said means for setting said n validity bits to a predetermined state is further responsive to a number of low order bits of the address of said memory location.

9. A cache memory system as set forth in claim 7 further comprising a plurality of contents memory (33) and a plurality of control memories (43) in a set associative arrangement.

10. Apparatus as set forth in claim 1 wherein
said means for writing a block includes
means for writing each word of said block of consecutive words into said main memory by direct memory access, and wherein
said means for simultaneously invalidating includes
means, responsive to writing of a predetermined word of said block of consecutive words by said means for writing each word, for simultaneously invalidating all of the words of said block of consecutive words in said cache.

* * * * *

UNITED STATES PATENT AND TRADEMARK OFFICE
CERTIFICATE OF CORRECTION

PATENT NO. : 4,504,902
DATED : March 12, 1985
INVENTOR(S) : Lee E. Gallaher, Wing N. Toy, Benjamin Zee It is certified that error appears in the above-identified patent and that said Letters Patent is hereby corrected as shown below:

Column 5, line 55, after "for" delete "signal" and substitute therefor --single--.

Signed and Sealed this

Fourteenth Day of January 1986

[SEAL]

Attest:

Attesting Officer

DONALD J. QUIGG

Commissioner of Patents and Trademarks